Oct. 9, 1934.  L. JANISCH  1,976,562

REGENERATIVE BRAKING

Filed Aug. 24, 1933

Inventor:
Leopold Janisch,
by Harry E. Dunham
His Attorney.

Patented Oct. 9, 1934

1,976,562

UNITED STATES PATENT OFFICE 1,976,562

REGENERATIVE BRAKING

Leopold Janisch, Berlin, Germany, assignor to General Electric Company, a corporation of New York Application August 24, 1933, Serial No. 686,632
In Germany September 8, 1932

3 Claims. (Cl. 172—179)

My invention relates to regenerative braking and has for an object the provision of a simple and effective means of obtaining regenerative braking irrespective of the speed of the driving motors.

Heretofore in the operation of electric motors employing regenerative braking there was usually employed automatic devices which connected the motors to the network when the motor potential exceeded the network potential. Regenerative automatic devices may consist of a polarized relay and a switch controlled thereby. For reasons of safety there is also provided a series resistance between the braking motors and the network or trolley which is mounted to receive the first regenerative impulse. This resistance is short circuited by means of a time closing switch.

In carrying out my invention in one form thereof, there is connected between the motors and the trolley an electric valve, for example a gas or vapor discharge vessel, in such a manner that it allows only the flow of current from the braking circuit into the trolley but not from the trolley into the braking circuit. Consequently, there are no disturbances caused by the flow of power from the trolley into the braking circuit.

Figure 1:
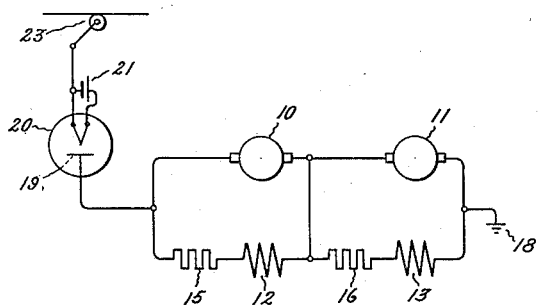
Figure 2:
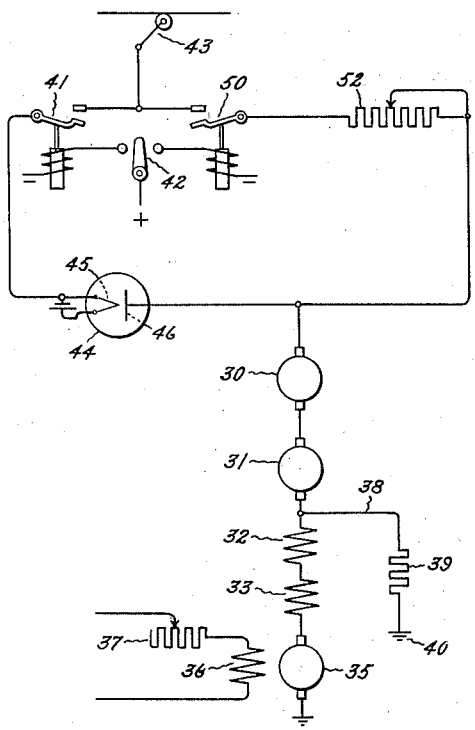

For a more complete understanding of my invention, reference should now be had to the accompanying drawing wherein I have shown diagrammatically in Fig. 1 an embodiment of my invention, while Fig. 2 shows a modification of the system shown in Fig. 1.

Referring to the drawing, I have shown my invention in one form as applied to the traction motors 10 and 11 respectively provided with field windings 12 and 13. As shown, the armatures of the motors are connected in local circuits with their respective field windings, the armature of the motor 10 being connected in series with the field winding 12 and a braking resistor 15, while the armature of the motor 11 is connected in series circuit relation with its field winding 13 and braking resistor 16. The braking circuit is connected to ground 18 and to the anode 19 of an electric valve 20, the cathode of which is connected to a trolley supply circuit 23. It will be observed that current cannot flow from the trolley supply circuit 23 into the braking circuit inasmuch as the electric valve 20 will not conduct current from the trolley to ground although it will permit at all times flow of current from the braking circuit to the trolley circuit.

In the modification of my invention illustrated in Fig. 2, I have shown a pair of motors 30 and 31 connected in series circuit relation with their respective field windings 32 and 33. In order to produce regenerative braking of the motors an exciter 35 is provided with a separately excited field winding 36 and a variable resistor 37, the armature of the exciter being connected in circuit with the field windings 32 and 33 to supply excitation current thereto. The field circuit may be traced from one side of the exciter by conductor 38, a balancing resistor 39 and by the ground connection 40 to the other side of the exciter armature. Whenever regenerative braking is desired, a connection means or contactor 41 is energized by means of a controller 42 to connect the trolley supply circuit 43 to the motor circuit. The contactor 41 also connects in the circuit an electric valve 44. Inasmuch as the cathode 45 is connected to the trolley side of the circuit and the anode 46 to the motor side, it will be observed that current cannot flow from the trolley to the motors. Consequently, the contactor 41 can be closed at any time without danger of current flowing from the trolley to the motors. The variable resistor 37 connected in circuit with the field winding 36 can, therefore, be operated to increase gradually the excitation of the motor field windings 32 and 33. As soon as the voltage of the motors 30 and 31 exceeds the trolley voltage, current will flow through the electric valve to the trolley.

For motoring operation of the motors, the controller 42 is operated to energize a contactor 50 to connect the motors through an accelerating resistor 52 to the trolley circuit.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A control system for traction motors arranged to be operated from a supply circuit, an electric valve, means for connecting said valve between said motors and said supply circuit, and means including said valve for establishing regenerative braking connections for said motors, said valve being connected to prevent flow of current from said supply circuit to said motors and to permit current flow from said motors to said supply circuit.

2. A regenerative braking system for traction motors comprising a trolley supply circuit for said motors, an electric valve, means connecting said valve between said motors and said supply circuit for permitting flow of current from said motors to said trolley, and means for controlling the regenerative braking of said motors said valve automatically passing current from said motors to said trolley as soon as the voltage of said motors exceeds the voltage of said trolley supply circuit.

3. A control system for traction motors comprising a trolley supply circuit for said motors, connecting means for connecting said motors directly to said trolley circuit, means for producing regenerative braking of said motors and an electric valve arranged to be connected between said motors and said trolley circuit during said regenerative braking for preventing flow of current from said trolley circuit to said motors.

LEOPOLD JANISCH.